(12) United States Patent
Ramasundaram et al.

(10) Patent No.: US 11,912,319 B2
(45) Date of Patent: Feb. 27, 2024

(54) BULK METALLIC GLASS LOAD CELL

(71) Applicant: FreightLucid, LLC, Dallas, TX (US)

(72) Inventors: Bharanikumar Ramasundaram, Flower Mound, TX (US); James W. Talley, Jr., Frisco, TX (US); Michael D. Rainone, Palestine, TX (US); Calvin C. Schlau, Winona, TX (US); Caleb N. Nehls, Tyler, TX (US)

(73) Assignee: FREIGHTLUCID, LLC, Dallas, TX (US)

( * ) Notice: Subject to any disclaimer, the term of this patent is extended or adjusted under 35 U.S.C. 154(b) by 665 days.

(21) Appl. No.: 16/999,651

(22) Filed: Aug. 21, 2020

(65) Prior Publication Data

US 2021/0053595 A1  Feb. 25, 2021

Related U.S. Application Data

(60) Provisional application No. 62/890,062, filed on Aug. 21, 2019.

(51) Int. Cl.
*B61L 15/00* (2006.01)
*B61K 9/02* (2006.01)
(Continued)

(52) U.S. Cl.
CPC .......... *B61L 15/0081* (2013.01); *B61F 5/16* (2013.01); *B61K 9/02* (2013.01); *B61L 15/0027* (2013.01);
(Continued)

(58) Field of Classification Search
CPC .......... B61L 15/0081; B61L 15/0027; B61L 15/0036; B61K 9/02; G01G 5/003; G01G 19/04; B61F 5/016
(Continued)

(56) References Cited

U.S. PATENT DOCUMENTS 3,072,209 A * 1/1963 Perry, Jr. ............... G01G 5/003
                                                              177/253
4,146,864 A    3/1979 Bethe
(Continued)

FOREIGN PATENT DOCUMENTS

CN         204422032 U  *  6/2015
CN         204422032 U     6/2015
(Continued)

OTHER PUBLICATIONS

Translation CN-204422032 (Year: 2015).*
(Continued)

*Primary Examiner* — Mischita L Henson
*Assistant Examiner* — Monica S Young
(74) *Attorney, Agent, or Firm* — BAKER BOTTS L.L.P.

(57) ABSTRACT

According to some embodiments, a load cell for determining a weight of a large object comprises a base plate comprising at least one recessed opening, a bulk metallic glass plug disposed in the at least one recessed opening of the base plate, and a top plate positioned above the base plate. A portion of the top plate is supported by the bulk metallic glass plug. The load cell further comprises a micro strain sensor coupled to the bulk metallic glass plug. The micro strain sensor is operable to determine a change in micro strain on the bulk metallic glass plug. The bulk metallic glass plug extends to a height where the top plate does not contact the base plate.

20 Claims, 4 Drawing Sheets

(51) Int. Cl.
  *G01G 5/00* (2006.01)
  *G01G 19/04* (2006.01)
  *B61F 5/16* (2006.01)

(52) U.S. Cl.
  CPC .......... *B61L 15/0036* (2013.01); *G01G 5/003* (2013.01); *G01G 19/04* (2013.01)

(58) Field of Classification Search
  USPC ............................................ 73/1.15; 177/211
  See application file for complete search history.

(56) References Cited

U.S. PATENT DOCUMENTS

| | | | | |
|---|---|---|---|---|
| 4,920,806 | A | * | 5/1990 | Obama .................... G01B 7/24 73/779 |
| 5,154,247 | A | * | 10/1992 | Nishimura ............ G01L 1/2287 177/229 |
| 5,359,903 | A | * | 11/1994 | Steiger .................... G01N 29/07 73/862.627 |
| 5,435,187 | A | * | 7/1995 | Ewy .......................... G01N 3/10 73/794 |
| 6,441,324 | B1 | | 8/2002 | Stimpson |
| 7,199,488 | B1 | | 4/2007 | Baker |
| 7,688,218 | B2 | | 3/2010 | LeFebvre et al. |
| 8,060,264 | B2 | | 11/2011 | Oestermeyer et al. |
| 8,212,685 | B2 | | 7/2012 | LeFebvre et al. |
| 8,244,411 | B2 | | 8/2012 | Baker |
| 8,812,175 | B2 | | 8/2014 | Baker |
| 8,823,537 | B2 | | 9/2014 | LeFebvre et al. |
| 9,026,281 | B2 | | 5/2015 | Murphy et al. |
| 9,365,223 | B2 | | 6/2016 | Martin et al. |
| 9,918,673 | B2 | | 5/2018 | Martin et al. |
| 2005/0085393 | A1 | * | 4/2005 | Nakao .................... G01L 1/2287 505/100 |
| 2009/0115010 | A1 | | 5/2009 | Fink et al. |
| 2014/0008999 | A1 | * | 1/2014 | Prest ........................ G01L 1/22 307/119 |
| 2015/0101870 | A1 | | 4/2015 | Gough et al. |
| 2020/0340849 | A1 | * | 10/2020 | Burisch .................. G01G 21/07 |

FOREIGN PATENT DOCUMENTS

| | | | |
|---|---|---|---|
| JP | H1161289 A | * | 3/1999 |
| JP | 2004027293 A | * | 1/2004 |
| KR | 20-2010-0008992 U | | 9/2010 |
| KR | 20220017107 A | * | 2/2022 |
| KR | 20220000979 U | * | 5/2022 |

OTHER PUBLICATIONS

International Preliminary Report on Patentability for PCT Patent Application No. PCT/US2020/047453, dated Mar. 3, 2022.

International Search Report and Written Opinion for PCT Patent Application No. PCT/US2020/047453, dated Nov. 30, 2020; 12 pages.

Supplementary European Search Report in European Application No. 20854546.7-1001/4018169/CT/US2020047453 dated Aug. 5, 2023.

* cited by examiner

BULK METALLIC GLASS LOAD CELL

RELATED APPLICATION

This application claims priority to U.S. Provisional Application Ser. No. 62/890,062, entitled "LOAD CELL SYSTEM AND METHOD," filed Aug. 21, 2019.

TECHNICAL FIELD OF THE INVENTION

This disclosure relates generally to systems, such as load cells, for determining the weight of large objects, and more particularly to a bulk metallic glass load cell.

BACKGROUND

Weighing various kinds of materials and objects is common in commercial transactions. For weighing a large and heavy object, conventional scales (which typically use springs) cannot be used without modification. Examples of large and heavy objects include railcars, automobiles, aircraft, trailers, portable housing, etc. Such application may instead use load cell-based weighing devices.

SUMMARY

Load cells for weighing heavy objects rely on metals such as aluminum, alloy steel, or stainless steel as the spring element. Aluminum, however, is too malleable to use for very heavy objects and steel is too stiff to perform accurate measurements when the weight of the heavy object changes by relatively small amounts. Accordingly, particular embodiments described herein include load cells capable of weighing heavy objects with a high accuracy even for slight weight variations.

According to some embodiments, a load cell for determining a weight of a large object comprises a base plate comprising at least one recessed opening, a bulk metallic glass plug disposed in the at least one recessed opening of the base plate, and a top plate positioned above the base plate. A portion of the top plate is supported by the bulk metallic glass plug. The load cell further comprises a micro strain sensor coupled to the bulk metallic glass plug. The micro strain sensor is operable to determine a change in micro strain on the bulk metallic glass plug. The bulk metallic glass plug extends to a height where the top plate does not contact the base plate.

In particular embodiments, the micro strain sensor is communicably coupled (e.g., wired or wirelessly) to a data collection device. The data collection device may be operable to transmit a weight measurement to an operations center.

In particular embodiments, the bulk metallic plug comprises one of a Zr-based, Fe-based, and Cu-based bulk metallic glass.

According to some embodiments, a truck assembly for a railcar comprises a center plate and a center pin for supporting a railcar structure, and a load cell disposed on the center plate. The load cell may comprise a center opening, and the center pin is positioned within the center opening of the load cell.

According to some embodiments, a vehicle comprises a container for transporting bulk material, an underframe coupled to and supporting the container, and one or more load cells disposed between the container and the underframe. Each load cell comprises a base plate comprising at least one bulk metallic glass plug and a top plate positioned above the base plate. A portion of the top plate is supported by the at least one bulk metallic glass plug. Each load cell further comprises a micro strain sensor coupled to the at least one bulk metallic glass plug. The micro strain sensor is operable to determine a change in micro strain on the at least one bulk metallic glass plug. The at least one bulk metallic glass plug extends to a height where the top plate does not contact the base plate.

In particular embodiments, each of the micro strain sensors is communicably coupled to a data collection device. The data collection device may be operable to transmit a weight measurement to an operations center. The data collection device may be operable to determine a weight of the container has changed and transmit a notification to an operations center. The data collection device may be operable to determine a weight of the container by combining measurements from each of the one or more load cells.

In particular embodiments, the container comprises a railcar hopper, the underframe comprises a pair of railcar truck assemblies disposed at each end of the underframe, and the one or more load cells comprise a pair of load cells, each disposed between one of the pair of railcar truck assemblies and the railcar hopper.

In particular embodiments, the container comprises a shipping container; and the underframe comprises a trailer.

Particular embodiments include technical advantages. For example, particular embodiments facilitate determining the weight of the product in a railcar at any time, without the need to move the railcar to a scale.

BRIEF DESCRIPTION OF THE DRAWINGS

For a more complete understanding of the present disclosure, reference is now made to the following description, taken in conjunction with the accompanying drawings, in which.

DETAILED DESCRIPTION

A load cell is a device typically used to weigh heavy objects (e.g., railcars, automobiles, aircraft, trailers, portable housing, etc.). A load cell includes a force gauge that measures a force applied to the load cell. The force is measured using an elastic element that is strong but also exhibits some elasticity. The elastic element may also be referred to as the spring element, although the elastic element rarely is in the form of a coil spring. A load cell also includes a transducer that creates electrical signals in response to the force on the load cell.

The force applied to the load cell is a function of the weight of the object. Because the magnitude of the electrical signal is proportional to the force applied, the electrical signal can be used to determine the weight of the object. Load cells typically use hydraulic, pneumatic, and strain gauges to create an electrical signal proportional to the force applied.

Many load cells for heavy objects rely on metals such as aluminum, alloy steel or stainless steel as the spring element. Some problems with existing load cells is that aluminum is too malleable to use for very heavy objects and steel is too stiff to perform accurate measurements when the weight of the heavy object changes by a relatively small amount.

Accordingly, particular embodiments described herein include a load cell capable of weighing heavy objects with high accuracy even for slight weight variations. Embodiments of the present disclosure and its advantages are best understood by referring to FIGS. 1 through 5 of the drawings, like numerals being used for like and corresponding parts of the various drawings.

Figure 1:
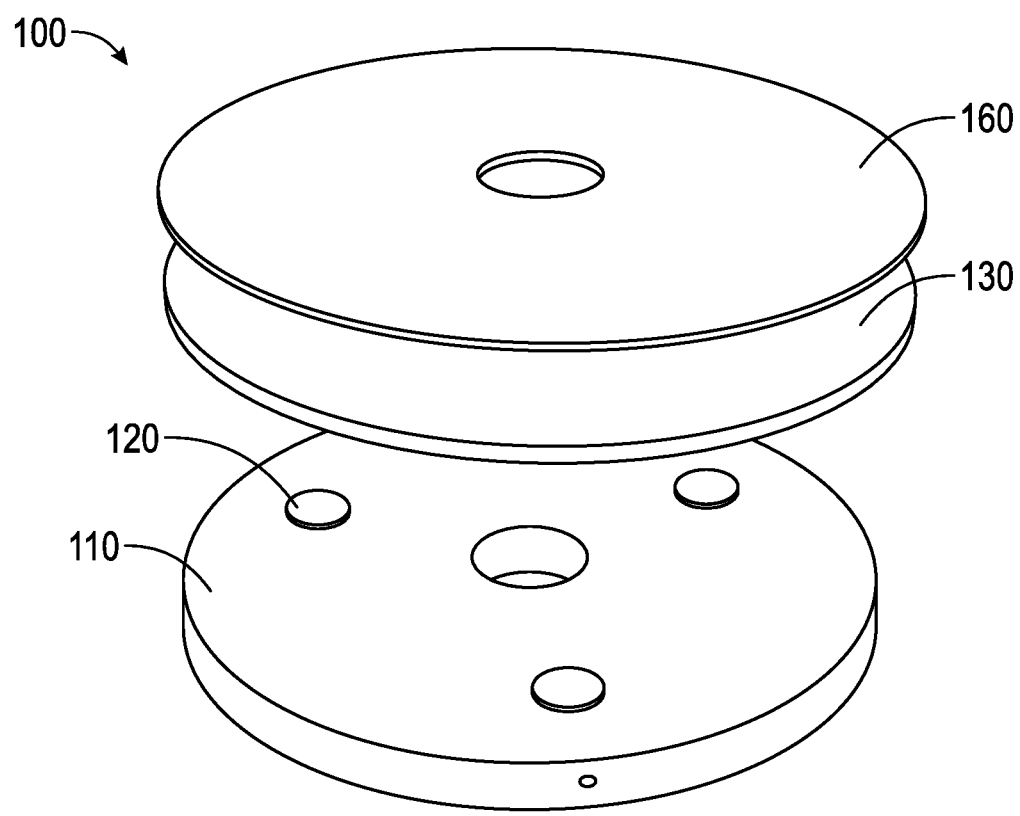
FIG. 1 is a perspective exploded view of a load cell, according to particular embodiments.

FIG. 1 is a perspective exploded view of a load cell, according to particular embodiments. Load cell 100 includes base plate 110, one or more bulk metallic glass (BMG) plugs 120 and top plate 130.

Base plate 110 is formed from a high strength material (for example, stainless steel) and supports the weight of the object on load cell 100. While base plate 110 is depicted as circular, it is understood that base plate 110 can be in any shape and may be of any size that supports BMG plug 120.

BMG plugs 120 comprise the spring elements for load cell 100. Examples of materials used to form BMG plugs 120 include, but are not limited to, Zr-based, Fe-based, and Cu-based bulk metallic glass.

Bulk metallic glass, also referred to as amorphous metal, is a solid metallic material, usually an alloy, with disordered atomic-scale structure. Most metals are crystalline in their solid state and have a highly ordered arrangement of atoms. Amorphous metals are non-crystalline and have a glass-like structure. Bulk metallic glass also has good electrical conductivity.

BMG plugs 120 support top plate 130. Top plate 130 is also formed from a high strength material (for example, stainless steel) and supports the weight of the object on load cell 100. While top plate 130 is depicted as circular, it is understood that top plate 130 can be in any shape and may be of any size that supports the object on load cell 100.

Figure 2:
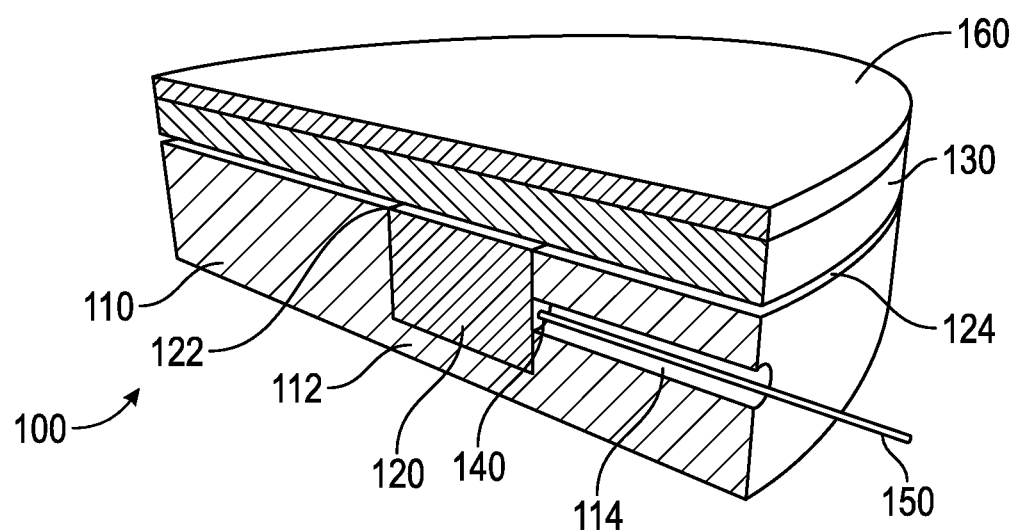
FIG. 2 is a cross sectional perspective view of a load cell, according to particular embodiments.

FIG. 2 is a cross sectional perspective view of a load cell, according to particular embodiments. As illustrated, BMG plugs 120 are positioned in recessed openings 112 formed in base plate 110. BMG plugs 120 have a size that is taller than the depth of recessed openings 112. When placed in recessed opening 112, a top portion 122 of BMG plug 120 extends out of and above base plate 110.

BMG plugs 120, in the illustrated example, are arranged in a triangular pattern to create a tripod effect to support top plate 130. It should be understood, however, that many other configurations of the placement of BMG plugs 120 may be used to support top plate 130 such as at the points of a square, pentagon, hexagon, etc. In some embodiments, a single BMG plug 120 may be used. For example, load cell 100 may include a single BMG plug 120 if the surface area of BMG plug 120 is at least half of the surface area of the top plate.

As illustrated in FIG. 2, top plate 130 is supported by BMG plugs 120 such that a space 124 is created between base plate 110 and top plate 130. Space 124 represents the limit top plate 130 can be displaced toward base plate 110 when a load is placed on top plate 130. In particular embodiments, space 124 is on the order of one to several millimeters.

During use, a load is placed on top plate 130, which distributes the weight of the load to BMG plugs 120. The weight of the load compresses BMG plugs 120 creating changes in the micro strain of the BMG plugs. Micro strain gauge 140 is disposed in contact with a side surface of BMG plug 120. During use, when a load is placed on top plate 130, BMG plug 120 is compressed and the micro strain of BMG plug 120 changes.

In some embodiments, wire 150 is coupled to micro strain gauge 140 and extends through a channel 114 formed in base plate 110. The electrical signals generated by micro strain gauge 140 are transmitted through wire 150 to a data collection device (illustrated in FIG. 5) which collects and processes the data and converts the data into a weight.

The change in micro strain is proportional to the weight placed on the load. Prior to use, the load cell may be tested at various known weights to create a function that relates a change in micro strain to the weight of the object placed on the load cell.

Load cell 100 may also include a cover 160 used to protect the components within the cell. While depicted as covering only the top plate of the load cell, in other embodiments cover 160 may cover the top and sides or even the entire load cell.

In the previous embodiments, the BMG plugs extend out from the base plate. In other embodiments, the BMG plugs may be positioned at or below the top of the base plate. One or more protrusions may be positioned on the bottom surface of the top plate, in alignment with the BMG plugs. The top plate is positioned above the base plate such that the one or more protrusions are positioned on the BMG plugs. When BMG plugs are used that are positioned below the top of the base plate, the protrusions may fit into an indentation formed above the BMG plugs.

The following examples are included to demonstrate example uses for particular embodiments. However, those of skill in the art will appreciate that changes can be made in the specific embodiments which are disclosed and still obtain a like or similar result without departing from the scope of the embodiments.

An important component of railcar commerce is the ability to frequently and accurately weigh an amount of product being shipped in a railcar. A common way to accomplish this is to weigh the entire railcar. Using the known weight of the empty railcar, the weight of the product can be determined. This method, while generally accurate, is cumbersome and time consuming.

For example, to weigh an entire railcar, the railcar is moved to a scale, which requires the use of railyard transportation. In a busy railyard, it can be difficult to quickly move a railcar for weighing. This becomes more of an issue during the railcar loading process. During a loading process the railcar may need to be moved away from the loading chute to the scale as many as five times to insure the optimal fill.

It is also useful to be able to know the weight of the product in the railcar while the product is in transit. At various stops along the route, it is particularly useful for the shipper to know that the weight of the product has not changed. Changes in the weight of the product can occur if some of the product is stolen or leaked during transit.

Weighing of the railcar during transit can be done by moving the railcar to a scale. As noted above, however, this can be time consuming. Furthermore, once transit of the product has begun, weighing of the material may not be possible because of the transportation schedule.

It is therefore desirable to determine the weight of the product in a railcar at any time, without the need to move the railcar to a scale. Having this ability enables a shipper to frequently and accurately know the amount of product that is being shipped to, utilized by, and billed to their customers.

In some embodiments, a BMG load cell, such as load cell 100 described above, may be incorporated into a railcar to facilitate rapid and accurate measurements of the weight of a railcar. In particular embodiments, the BMG load cell is incorporated into a railcar support.

For example, a typical railcar includes a holding structure (e.g., a tank, open wagon, close wagon, etc.) in which the product being transported is stored and an underframe that includes front and rear truck assemblies. A railcar coupler is typically attached to each of the truck assemblies. A center plate assembly includes a top center plate mounted to the holding structure and a bottom center plate mounted to the truck assembly. The bottom center plate typically includes a center pin that projects upwards and mates with an opening in the top center plate.

In some embodiments, a BMG load cell is positioned between the top center plate and the bottom center plate, such that the weight of the holding structure is at least partially supported by the load cell. An example is illustrated in FIGS. 3 and 4.

Figure 3:
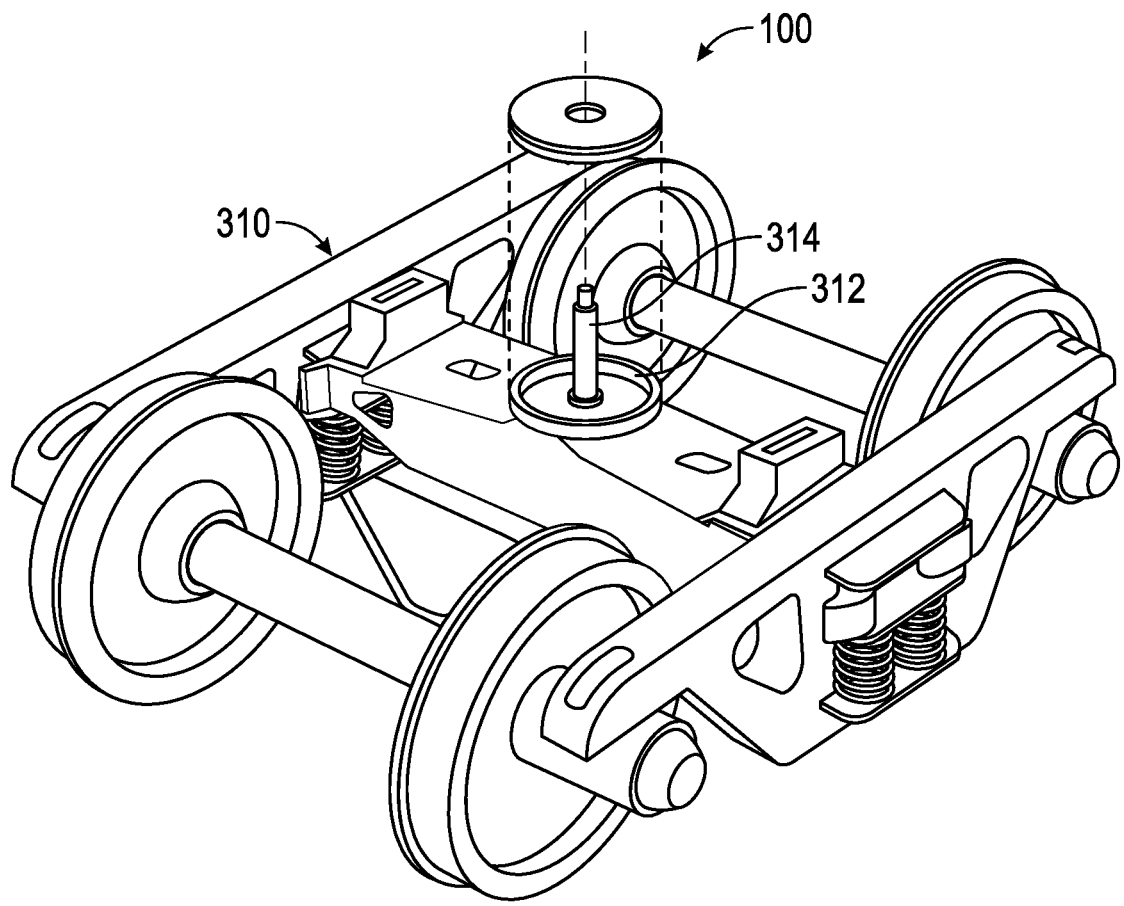
FIG. 3 is an example of a load cell coupled to a railcar truck assembly.

FIG. 3 is an example of a load cell coupled to a railcar truck assembly. For example, truck assembly 310 includes center plate 312 and center pin 314. Load cell 100 described with respect to FIGS. 1 and 2 may be disposed on center plate 312. Load cell 100 is operable to measure the weight in a holding structure supported by truck assembly 310. For example, a railcar may comprise a hopper car as illustrated in FIG. 4.

Although load cell 100 is illustrated with respect to bottom center plate of truck assembly 310, load cell 100 may be in some embodiments load cell 100 may be coupled to a top center plate of the holding structure supported by truck assembly 310. Either way, load cell 100 is disposed between truck assembly 310 and the holding structure.

Figure 4:
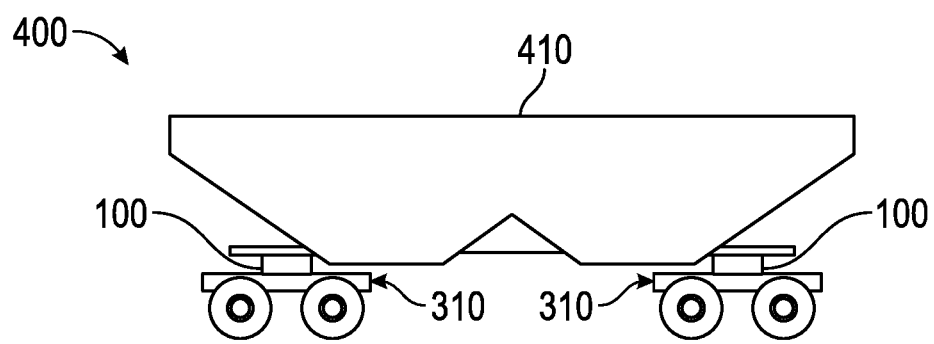
FIG. 4 is an example of load cells coupled to a hopper car.

FIG. 4 is an example of load cells coupled to a hopper car. Hopper car 400 includes a pair of truck assemblies 310 supporting hoppers 410. Disposed between truck assemblies 310 and hoppers 410 are a pair of load cells 100. Load cells 100 are operable to measure the weight of hoppers 410 as a commodity is loaded or unloaded. Load cells 100 may measure the weight of hoppers 410 at stops along a route to confirm that the weight has not changed. If the weight has changed, a notification may be sent to an operations center.

In some embodiments, additional load cells may be place at other locations instead of or in addition to the load cells at the truck assemblies. For example, some embodiments may include load cells at a center support. Some railcars include side bearings. These railcars may include load cells at the side bearings.

Although a hopper car is illustrated as one example, load cells may be used on tank cars, well cars, or any other suitable railcar. In addition, particular embodiments are not limited to railcars and may be used with any suitable vehicle (e.g. land vehicle, marine vehicle, aircraft, etc.) that transports heavy loads. Some embodiments may include load cells coupled to shipping containers.

Use of load cells in a railcar application offers advantages over conventional measurements. The BMG load cells, having substantially instant feedback, enable loaders to weigh the product as the product is loaded into the holding structure. This minimizes the need to move the railcar outside of the loading dock to the scale. Furthermore, on arrival at the unloading facility, load cells on the railcar can be used to monitor the unloading process. Once the loading process has begun, as detected by a reduction in weight of the holding structure, the shipper of the product will know to initiate the billing process, leading to faster payment on the shipment. Additionally, during transit, when stopped, the load cell in the railcar may be intermittently (e.g., randomly) checked to detect a loss of load. This may help prevent theft of the product in the railcar.

In some embodiments, BMG load cells may be used to determine the weight of product in a railcar. An existing railcar can be retrofitted to include load cells mounted inside the center plate assemblies of the front and rear truck assemblies, as described above. Additional load cells may also be placed on the holding structure support at the center of the railcar. Before loading of the railcar, the weight of the empty holding structure may be determined using the load cells. During and/or after loading of the product, the weight of the added product may be determined using the load cells. The weight, at any given time, is determined as a function of the change in micro strain.

Figure 5:
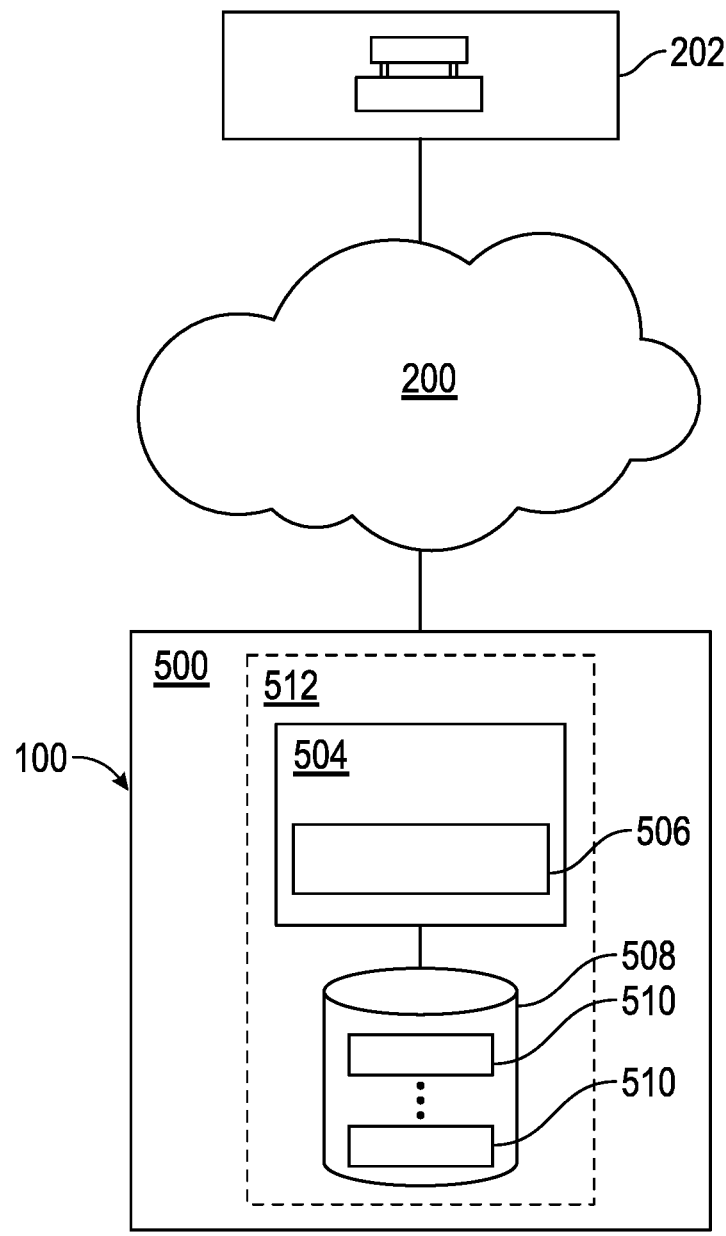
FIG. 5 is a data collection device, according to particular embodiments.

FIG. 5 is a data collection device, according to particular embodiments. One or more load cells 100 may be communicably coupled to data collection device 500. The coupling may be wired or wireless. Data collection device 500 is operable to receive electronic signals from load cell 100 and determine a weight on load cell 100 based on the electronic signals. Data collection device 500 may be able to store and/or transmit the determined weights, and transmit a notification based on weight fluctuations. Data collection device 500 may transmit weight measurements and/or notifications to operations center 502 over network 200.

In some embodiments, data collection device 500 comprises wireless communication circuitry for communication over a wireless network. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards, including Internet-of-Things (IoT), vehicle to vehicle communication (V2V), etc.; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Data collection device 500 comprises processing circuitry 512. Processing circuitry 512 comprises memory 508 operable to store weight measurements 510 and instructions 506, and one or more processors 254 coupled to memory 508. One or more processors 504 may be implemented as one or more central processing unit (CPU) chips, logic units, cores (e.g., a multi-core processor), field-programmable gate array (FPGAs), application specific integrated circuits (ASICs), or digital signal processors (DSPs). The one or more processors are configured to implement various instructions 506 to determine a weight of an object and may be implemented in hardware and/or software.

Memory 508 comprises one or more disks, tape drives, or solid-state drives, and may be used as an over-flow data storage device, to store programs when such programs are selected for execution, and to store instructions and data that are read during program execution, such as instructions and logic rules. Memory 508 may be volatile or non-volatile and may comprise read only memory (ROM), random access memory (RAM), ternary content-addressable memory (TCAM), dynamic RAM (DRAM), and/or static RAM (SRAM). Memory 508 may comprise cloud storage. Memory 508 is operable to store, for example, weight measurements 510.

Network 200 comprises a plurality of network nodes configured to communicate data between data collection device 500 and operations center 202. Examples of network nodes include, but are not limited to, routers, switches, modems, web clients, and web servers. Network 200 comprises any suitable type of wireless and/or wired network including, but not limited to, all or a portion of the Internet, the public switched telephone network, a cellular network, and/or a satellite network. Network 200 is configured to support any suitable communication protocols as would be appreciated by one of ordinary skill in the art upon viewing this disclosure.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of this disclosure.

The invention claimed is:

1. A load cell for determining a weight of an object, the load cell comprising:
    a base plate comprising at least one recessed opening;
    a bulk metallic glass plug disposed in the at least one recessed opening of the base plate;
    a top plate positioned above the base plate, wherein a portion of the top plate is supported by the bulk metallic glass plug;
    a micro strain sensor coupled to the bulk metallic glass plug, wherein the micro strain sensor comprises a sensor that determines a change in micro strain on the bulk metallic glass plug caused by compression of the bulk metallic glass by the object; and
    wherein the bulk metallic glass plug extends to a height where the top plate does not contact the base plate.

2. The load cell of claim 1, wherein the micro strain sensor is communicably coupled to a data collection device.

3. The load cell of claim 2, wherein the micro strain sensor is communicably coupled to the data collection device via one or more wires.

4. The load cell of claim 2, wherein the micro strain sensor is communicably coupled wirelessly to the data collection device.

5. The load cell of claim 2, wherein the data collection device is operable to transmit a weight measurement to an operations center.

6. The load cell of claim 1, wherein the bulk metallic glass plug comprises one of a Zr-based, Fe-based, and Cu-based bulk metallic glass.

7. A truck assembly for a railcar, the truck assembly comprising:
    a center plate and a center pin for supporting a railcar structure;
    a load cell disposed on the center plate, the load cell comprising:
        a base plate comprising at least one recessed opening;
        a bulk metallic glass plug disposed in the at least one recessed opening of the base plate;
        a top plate positioned above the base plate, wherein a portion of the top plate is supported by the bulk metallic glass plug;
        a micro strain sensor coupled to the bulk metallic glass plug, wherein the micro strain sensor comprises a sensor that determines a change in micro strain on the bulk metallic glass plug caused by compression of the bulk metallic glass by the object; and
        wherein the bulk metallic glass plug extends to a height where the top plate does not contact the base plate.

8. The truck assembly of claim 7, wherein the micro strain sensor is communicably coupled to a data collection device.

9. The truck assembly of claim 8, wherein the micro strain sensor is communicably coupled to the data collection device via one or more wires.

10. The truck assembly of claim 8, wherein the micro strain sensor is communicably coupled wirelessly to the data collection device.

11. The truck assembly of claim 8, wherein the data collection device is operable to transmit a weight measurement to an operations center.

12. The truck assembly of claim 7, wherein the bulk metallic glass plug comprises one of a Zr-based, Fe-based, and Cu-based bulk metallic glass.

13. The truck assembly of claim 7, wherein the load cell comprises a center opening, and the center pin is positioned within the center opening of the load cell.

14. A vehicle comprising:
    a container for transporting bulk material;
    an underframe coupled to and supporting the container; and
    one or more load cells disposed between the container and the underframe, wherein each load cell of the one or more load cells comprises:
        a base plate comprising at least one bulk metallic glass plug;
        a top plate positioned above the base plate, wherein a portion of the top plate is supported by the at least one bulk metallic glass plug;
        a micro strain sensor coupled to the at least one bulk metallic glass plug, wherein the micro strain sensor comprises a sensor that determines a change in micro strain on the at least one bulk metallic glass plug caused by compression of the bulk metallic glass by the object; and
        wherein the at least one bulk metallic glass plug extends to a height where the top plate does not contact the base plate.

15. The vehicle of claim 14, wherein each of the micro strain sensors is communicably coupled to a data collection device.

16. The vehicle of claim 15, wherein the data collection device is operable to transmit a weight measurement to an operations center.

17. The vehicle of claim 15, wherein the data collection device is operable to determine a weight of the container has changed and transmit a notification to an operations center.

18. The vehicle of claim 15, wherein the data collection device is operable to determine a weight of the container by combining measurements from each of the one or more load cells.

19. The vehicle of claim 14, wherein:
    the container comprises a railcar hopper;
    the underframe comprises a pair of railcar truck assemblies disposed at each end of the underframe; and
    the one or more load cells comprise a pair of load cells, each disposed between one of the pair of railcar truck assemblies and the railcar hopper.

20. The vehicle of claim 14, wherein the container comprises a shipping container; and the underframe comprises a trailer.

* * * * *